US008825439B2

(12) United States Patent
Mayer et al.

(10) Patent No.: US 8,825,439 B2
(45) Date of Patent: Sep. 2, 2014

(54) MULTITURN ROTARY ENCODER

(75) Inventors: Elmar Mayer, Nussdorf (DE); Thomas Schuermann, Rosenheim (DE); Michael Walter, Polling (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 351 days.

(21) Appl. No.: 13/123,506

(22) PCT Filed: Aug. 31, 2009

(86) PCT No.: PCT/EP2009/061197
§ 371 (c)(1),
(2), (4) Date: Apr. 8, 2011

(87) PCT Pub. No.: WO2010/040601
PCT Pub. Date: Apr. 15, 2010

(65) Prior Publication Data
US 2011/0196648 A1 Aug. 11, 2011

(30) Foreign Application Priority Data

Oct. 9, 2008 (DE) .......................... 10 2008 051 083

(51) Int. Cl.
*G06F 15/00* (2006.01)
*H03M 1/22* (2006.01)
(52) U.S. Cl.
USPC ...................................... 702/151; 250/231.18
(58) Field of Classification Search
CPC ............ G06F 15/00; G01D 1/00; G01D 3/00;
G01D 9/00; G01D 5/145; G01D 5/3473;
G01D 5/00; G01D 5/34738; H03M 1/22

USPC ............ 702/151; 250/231.13, 231.14, 231.18
See application file for complete search history.

(56) References Cited

U.S. PATENT DOCUMENTS 4,070,769 A * 1/1978 Hollis ............................... 434/2
5,448,079 A * 9/1995 Schulz ...................... 250/559.29
(Continued)

FOREIGN PATENT DOCUMENTS

DE 198 20 014 11/1998
EP 1 076 809 2/2001
WO WO 2004/031695 4/2004

OTHER PUBLICATIONS

International Search Report, issued in corresponding International Application No. PCT/EP2009/061197.

*Primary Examiner* — John Breene
*Assistant Examiner* — Ruihua Zhang
(74) *Attorney, Agent, or Firm* — Kenyon & Kenyon LLP

(57) ABSTRACT

A multiturn rotary encoder includes a singleturn code disk which is joined in rotatably fixed manner to a shaft and which has a code track that is scannable by a singleturn scanning unit to ascertain the absolute position within one revolution of the shaft, a multiturn unit for measuring revolution data which are suitable for ascertaining the number of revolutions performed by the shaft, and an evaluation unit which is connected to the multiturn unit via at least two digital interfaces for transmitting the revolution data. The revolution data include at least two data words which have a different rate of change during rotation of the shaft, the interface for transmitting the data word having the highest rate of change to the evaluation unit is a parallel interface, and the interface for transmitting the data word having the lowest rate of change to the evaluation unit is a serial interface.

10 Claims, 5 Drawing Sheets

(56) References Cited

U.S. PATENT DOCUMENTS

| | | | |
|---|---|---|---|
| 6,268,845 B1 * | 7/2001 | Pariza et al. | 345/581 |
| 6,542,088 B1 * | 4/2003 | Bielski et al. | 341/15 |
| 7,395,178 B2 | 7/2008 | Hofbauer et al. | |
| 2004/0210416 A1 * | 10/2004 | Rodi | 702/163 |

* cited by examiner

MULTITURN ROTARY ENCODER

FIELD OF THE INVENTION

The present invention relates to a multiturn rotary encoder. In particular, the invention relates to the interface architecture for transmitting revolution data from a multiturn unit to an evaluation unit in order to ascertain the number of revolutions performed by a shaft.

BACKGROUND INFORMATION

Multiturn rotary encoders are used in drive technology to measure the position as well as the number of revolutions performed by a shaft. Such multiturn rotary encoders have been known for a long time in the prior art. They are usually made up of a first measuring standard, by scanning which, information is obtained about the position of the shaft within one complete revolution, and one or more further measuring standards, whose scanning supplies position information about the number of revolutions performed by the shaft.

The units for determining position within one revolution of the shaft are combined under the term "singleturn stage." The units for ascertaining position information regarding the number of revolutions performed by the shaft form a multiturn unit. From the position information of the singleturn stage and the multiturn unit, an evaluation unit forms a combined position value which includes both the number of complete revolutions performed up to now, as well as the absolute position within the instantaneous revolution.

In modern position-measuring devices, a large-scale-integrated, application-specific component (ASIC) is often used as evaluation unit, which in the ideal case, already includes the detectors for scanning the singleturn stage, as well as the circuit elements necessary for processing the detector signals to form the position value. If an optical scanning principle is used, for example, the detectors are in the form of a photodetector array. In this combination, one also speaks of an opto-ASIC.

To scan the second measuring standards in the multiturn unit, separate scanning units are provided which generate position values in absolute form. For example, the multiturn unit of a typical multiturn rotary encoder has three multiturn stages, which are driven via a three-stage gear unit having a fixed gear-ratio factor. Magnets may be used as measuring standards, which are mounted axially on gear wheels and which in each case are scanned by a Hall sensor that outputs the angular position of the assigned gear wheel as an absolute value with, e.g., 8-bit resolution. These absolute values are transmitted via digital interfaces to the evaluation unit. A multiturn rotary encoder of this type is described, for example, in European Patent No. 1 076 809.

Multiturn rotary encoders are also known whose multiturn unit has a counter that is incremented or decremented by counting pulses, which are generated upon each complete revolution of the shaft. The count value in this case directly represents the number of revolutions performed by the shaft. A typical data word length of the count value is 18 bits.

In known methods heretofore, preferably parallel interfaces were used for transmitting data from the multiturn unit to the evaluation unit, since they are easy to implement and achieve high data-transmission rates. The disadvantage in this design approach is the high number of signal lines required. Thus, the three-stage system described above alone requires 24 lines for transmitting the three 8-bit long data words. Added to this are also various control lines. This is particularly problematic when an ASIC or opto-ASIC is to be used as evaluation unit, since the number of terminal pads needed directly influences the chip area and therefore the costs per ASIC.

The use of serial interfaces likewise proves to be problematic, since simple serial interfaces, which can be implemented with low expenditure in an ASIC, are usually too slow for exacting position-measuring devices, e.g., for measuring high-speed spindles, and fast serial interfaces require great circuit complexity and therefore again have a negative effect on the chip area needed and lead to increased costs. Moreover, fast serial interfaces require a high clock-pulse rate with steep clock-pulse edges that may give rise to problems due to crosstalk to the signal processing, especially of the singleturn stage, and lead to high current consumption because of the required drive strength of the pads.

SUMMARY

Example embodiments of the present invention provide a multiturn rotary encoder which has an improved interface architecture.

A multiturn rotary encoder includes a singleturn code disk which is joined in rotatably fixed manner to a shaft and which has a code track that is scannable by a singleturn scanning unit to ascertain the absolute position within one revolution of the shaft, a multiturn unit for measuring revolution data which are suitable for ascertaining the number of revolutions performed by the shaft, and an evaluation unit which is connected to the multiturn unit via at least two digital interfaces for transmitting the revolution data. The revolution data include at least two data words which have a different rate of change during rotation of the shaft, the interface for transmitting the data word having the highest rate of change to the evaluation unit is a parallel interface, and the interface for transmitting the data word having the lowest rate of change to the evaluation unit is a serial interface.

The serial interface may be implemented both as a point-to-point connection and as a bus connection, the bus connection being especially advantageous due to the accompanying savings of further pins at the evaluation unit.

The advantages of the multiturn rotary encoder described herein have a particularly great impact if an ASIC is used as evaluation unit, since in this case, an optimal cost/benefit ratio is achieved due to the reduction in the number of terminal pins needed, without significant increase of chip area.

Further advantages of example embodiments of the present invention and details pertaining thereto are described in more detail below in the following description with reference to the figures.

DETAILED DESCRIPTION

FIG. 1 schematically illustrates a multiturn rotary encoder according to an example embodiment of the present invention.

Figure 4:
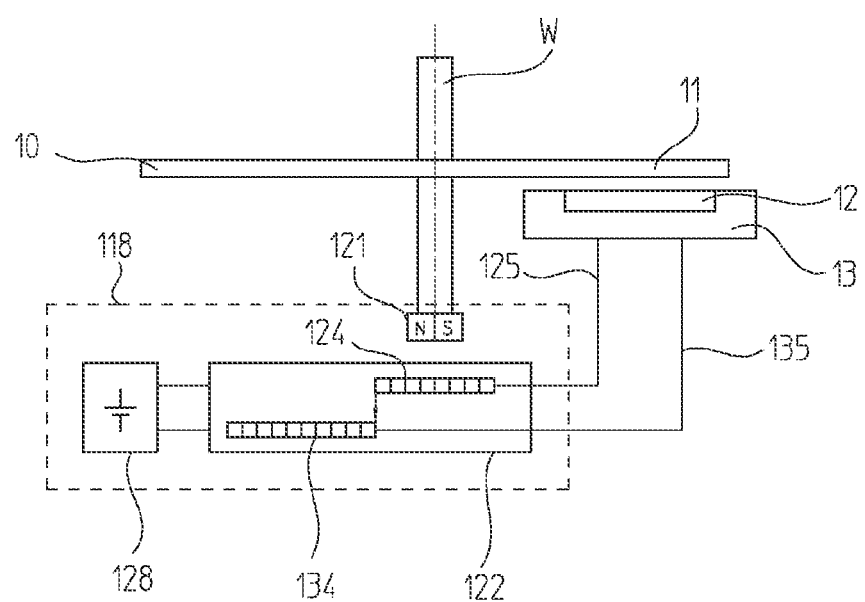

FIG. 4 schematically illustrates a multiturn rotary encoder according to an example embodiment of the present invention.

Figure 5:
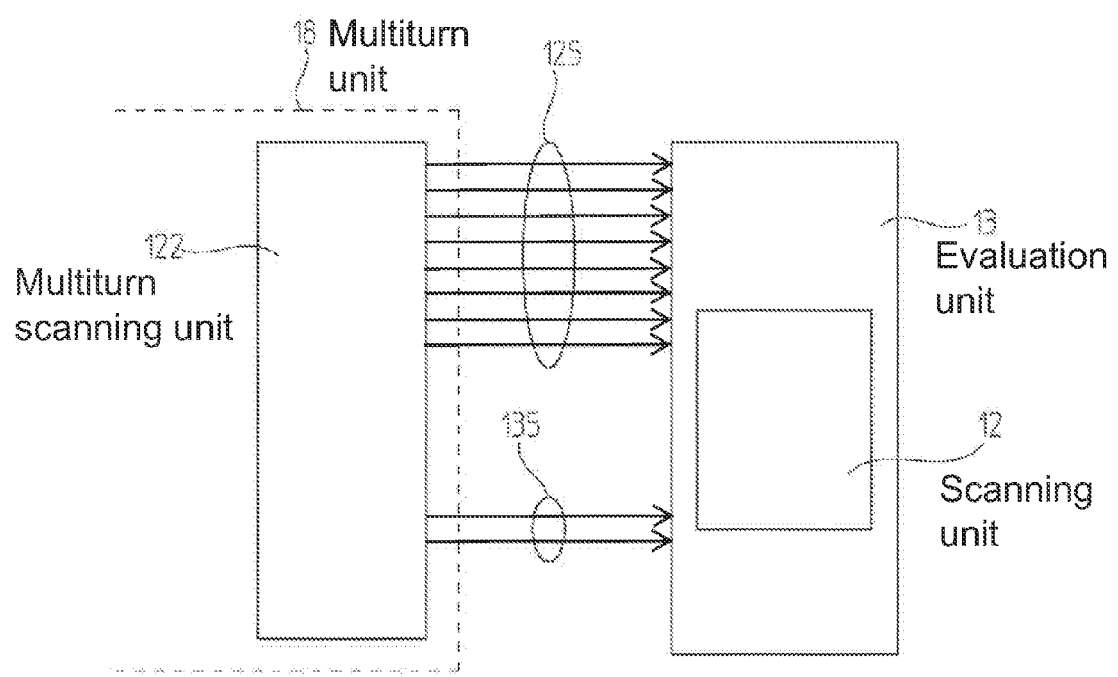

FIG. 5 shows a block diagram having an interface architecture for the exemplary embodiment shown in FIG. 4.

DETAILED DESCRIPTION

Figure 1:
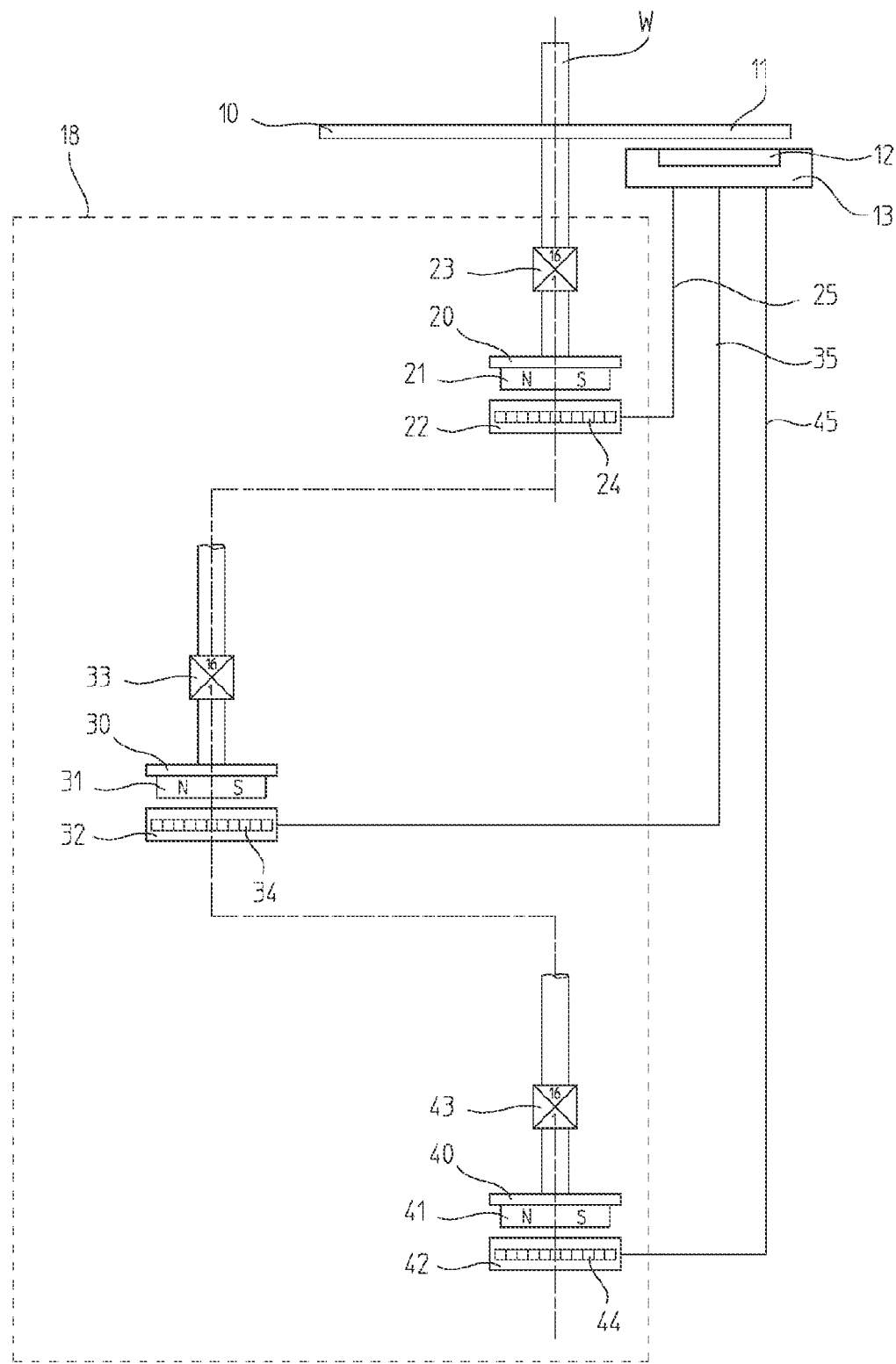

FIG. 1 schematically illustrates a multiturn rotary encoder according to an example embodiment of the present invention. The singleturn stage, i.e., the device for measuring the position value within one revolution of a shaft W, includes a singleturn code disk 10 whose midpoint M is joined in rotatably fixed manner to the shaft to be measured, and which bears an annular code track 11 disposed concentrically with respect to midpoint M. In addition, a singleturn scanning unit 12 is provided for reading code track 11 and for ascertaining the absolute position value corresponding to the angular position of singleturn code disk 10. If the optical scanning principle is employed to ascertain position, code track 11 includes a bar pattern, for instance, having regions with different optical properties, e.g., transparent/nontransparent or reflecting/non-reflecting. Light from a light source is emitted in the direction of code track 11, is modulated by it, and finally strikes photodetectors which are disposed in singleturn scanning unit 12. A light source is not shown here for reasons of clarity. Code track 11 may be coded absolutely or/and be implemented incrementally, and optionally, may include a plurality of graduation tracks placed side by side.

To measure revolution data, which are suitable for ascertaining the number of revolutions performed by shaft W, a multiturn unit 18 is provided. In the example shown, it includes three multiturn stages. Each of these multiturn stages includes a multiturn code disk 20, 30, 40 having a code element 21, 31, 41 each, as well as a multiturn scanning unit 22, 32, 42. The revolution data are data words 24, 34, 44 which are ascertained in multiturn scanning units 22, 32, 42. Multiturn code disks 20, 30, 40 are driven by shaft W to be measured, via a three-stage reduction gear 23, 33, 43; during rotation of shaft W, first multiturn code disk 20, which is driven by first gear stage 23, has the highest rotational speed, and third multiturn code disk 40, which is driven by the third and at the same time last gear stage 43, has the lowest rotational speed. Correspondingly, data words 24, 34, 44 generated in multiturn scanning units 22, 32, 42 have different rates of change; first data word 24 of the first multiturn stage has the highest rate of change, while third data word 44 of the third and at the same time last multiturn stage has the lowest rate of change.

An especially simple design of the multiturn stages is obtained if a magnetic scanning principle is used for it. In this case, code elements 21, 31, 41 are made of disk-shaped permanent magnets which are joined in rotatably fixed manner to multiturn code disks 20, 30, 40 and which in each case have a dipole, i.e., a magnetic north pole N and south pole S. It is particularly advantageous to use suitable gear wheels of reduction gear 23, 33, 43 as multiturn code disks 20, 30, 40. To ascertain the angular position of code elements 21, 31, 41, the dipoles are scanned by Hall sensors disposed in respective multiturn scanning units 22, 32, 42. For example, the resolution of multiturn scanning units 22, 32, 42 is 8 bits, that is, one revolution of multiturn code disks 20, 30, 40 is resolved with 256 absolute position values and is made available in the form of data words 24, 34, 44.

A multiturn rotary encoder of this type is described, for example, in European Patent No. 1 076 809.

An evaluation unit 13 is provided to evaluate the individual position values of the singleturn stage and of the multiturn stages in order to form one overall position value. Advantageously, evaluation unit 13 is an ASIC, on which singleturn scanning unit 12 is already integrated. If, as described above, the singleturn stage is constructed according to the optical scanning principle, and the ASIC also includes the detectors for detecting the light modulated by code track 11, then the ASIC is also referred to as an opto-ASIC. Data words 24, 34, 44, which contain the absolute position values of the multiturn stages, are transmitted to evaluation unit 13 via digital interfaces 25, 35, 45, as explained below.

Figure 2:
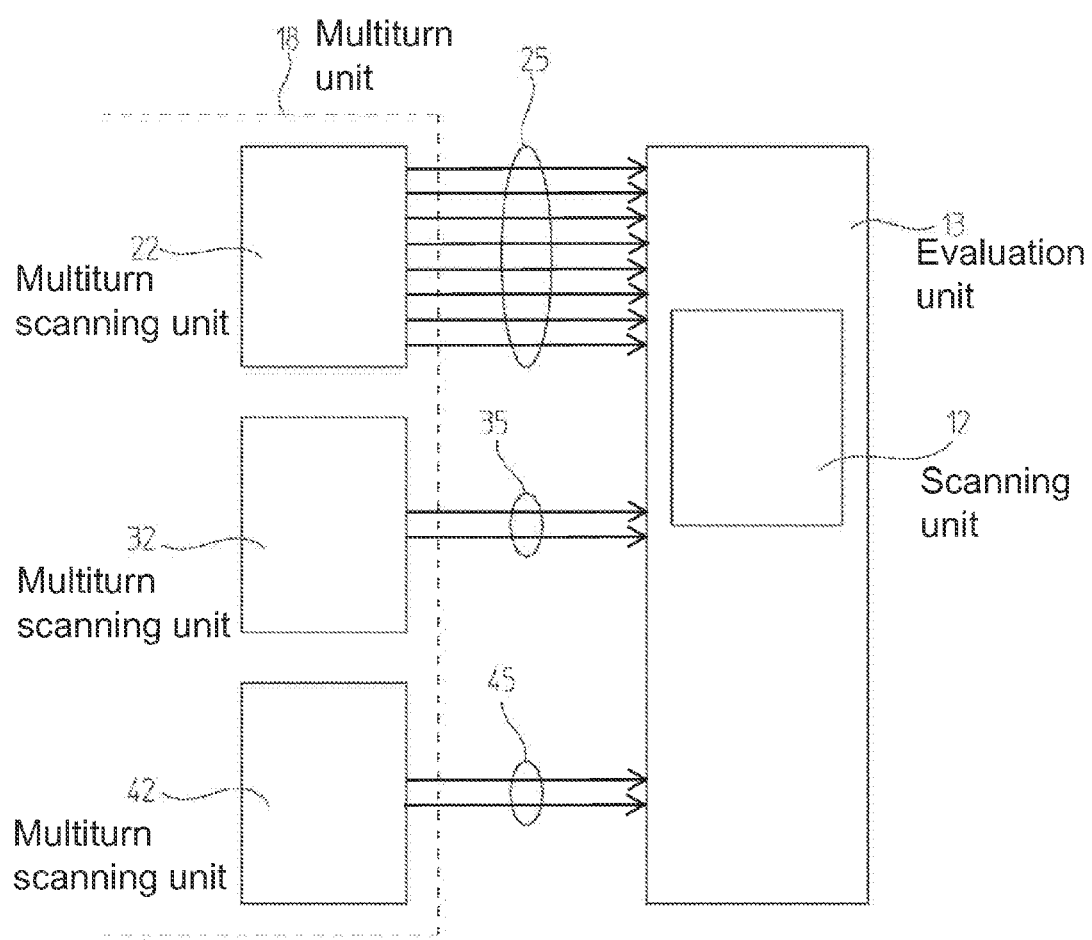
FIG. 2 shows a block diagram having an interface architecture for the exemplary embodiment shown in FIG. 1.

FIG. 2 shows an interface architecture according to an example embodiment of the present invention for transmitting data words 24, 34, 44 from multiturn unit 18 to evaluation unit 13. For the sake of simplicity, only multiturn scanning units 22, 32, 42 of multiturn unit 18 are shown, which are connected to evaluation unit 13 via digital interfaces 25, 35, 45.

In order to form one overall position value from the individual absolute position values of the singleturn stage and of the three multiturn stages, it is necessary to combine them. In this context, it is especially important that the completion of one full revolution of each of the code disks is recognized by the code disk of the next-slower gear stage.

For the further considerations, a gear-ratio factor of $\frac{1}{16}$ is assumed for each of the three gear stages of reduction gear 23, 33, 43, that is, first gear stage 23 reduces the rotational speed of first multiturn code disk 20 to $\frac{1}{16}$ the rotational speed of shaft W to be measured (i.e., of singleturn code disk 10), the rotational speed of second multiturn code disk 30 is reduced by second gear stage 33 to $\frac{1}{16}$ the rotational speed of first gear stage 23 (i.e., of first multiturn code disk 20), and finally, the rotational speed of third multiturn code disk 40 is brought by third and last gear stage 43 to $\frac{1}{16}$ the rotational speed of preceding second gear stage 33 (or of second multiturn code disk 30). The resolution of each multiturn code disk 20, 30, 40 is 8 bits, the four higher-order bits (4 . . . 7) being used for counting the revolutions and the four lower-order bits (0 . . . 3), which overlap with the four higher-order bits (4 . . . 7) of the preceding gear stage having the next-higher rotational speed, being used for what is termed the code connection in order to permit a correct combination of the individual absolute position values of the singleturn stage and of the three multiturn stages to form the overall position value. Thus, a maximum counting range of 4096 revolutions is obtained. 18000 R/min is assumed as the maximum rotational speed of shaft W to be measured.

Data words 24, 34, 44, generated in multiturn scanning units 22, 32, 42, have different rates of change during rotation of shaft W, corresponding to the rotational speeds of multiturn code disks 20, 30, 40. First data word 24 generated in first multiturn scanning unit 22 has the highest rate of change, second data word 34 generated in second multiturn scanning unit 32 has a medium rate of change, and third data word 44 generated in third multiturn scanning unit 42 has the lowest rate of change.

It is decisive for connection reliability that the position values be available promptly to evaluation unit 13. While this requirement can be satisfied without difficulty by parallel interfaces, the use of serial interfaces for transmitting data words 24, 34, 44 from multiturn scanning units 22, 32, 42 to evaluation unit 13 may be problematic.

A numerical example in this regard is described below.

Interfaces 25, 35, 45 for transmitting data words 24, 34, 44 from multiturn scanning units 22, 32, 42 to evaluation unit 13 should have a transmission frequency of 200 kHz. This corresponds to a typical value of the widespread I2C interface which, as a 2-wire interface, is particularly suitable for serial data transmission between integrated circuits over short distances, and is easy to implement in such circuits.

In order to transmit an 8-bit value, these interfaces 25, 35, 45 require at least 40 μs (bits additionally to be transmitted such as start and stop bits remain unconsidered in this analysis). With respect to singleturn code disk 10, this means that at maximum rotational speed during the data transmission, it describes an angular value of 4.32°. That is, dependent on the rotational speed, the angular position of singleturn code disk 10 during the transmission of first data word 24 from first multiturn scanning unit 22 to evaluation unit 13 changes between 0° when the shaft is at standstill and 4.32° at maximum rotational speed. This results in a considerable reduction in connection reliability.

If one considers the second multiturn stage, it turns out that the angular position of first multiturn code disk 20 during the transmission of second data word 34 from second multiturn scanning unit 32 via second interface 35 to evaluation unit 13 at maximum rotational speed of shaft W changes by only 0.27° at most. In many cases, this value may already be disregarded with respect to the connection reliability.

For the third multiturn stage, a maximum variance of the angular position of second multiturn code disk 30 of only 0.017° is obtained, which no longer has any influence on the connection reliability.

In summary, it may thus be stated that the transmission speed of a simple, easy to implement serial interface is sufficient for the transmission of absolute position values from third multiturn scanning unit 42 to evaluation 13, and at least here, it is possible to dispense with a parallel interface which is costly in terms of the necessary terminal pins.

In this example, a serial interface is still suitable for transmitting second data word 34 from second multiturn scanning unit 32 to evaluation unit 13, as well. Because of the reduction in connection reliability, this serial interface is no longer suitable for transmitting data from first multiturn scanning unit 22, whose assigned first multiturn code disk 20 has the highest rotational speed, to evaluation unit 13.

However, as mentioned at the outset, the implementation of a faster serial interface is not expedient for reasons of the necessary cost-intensive chip area and the disadvantages from the standpoint of circuit engineering due to the high clock-pulse rate required With regard to the requirements of reducing the chip area by reducing the number of pins needed, as well as the use of easy to implement interfaces, the use of a parallel interface as first interface 25 for the transmission of data between first multiturn scanning unit 22 and evaluation unit 13 leads to the best cost/benefit ratio. In this specific example, by using one parallel and two serial interfaces, the pins needed for the interfaces are reduced from 24 (three parallel interfaces having 8 bits each, disregarding control lines) to 12 (two pins per serial interface).

Figure 3:
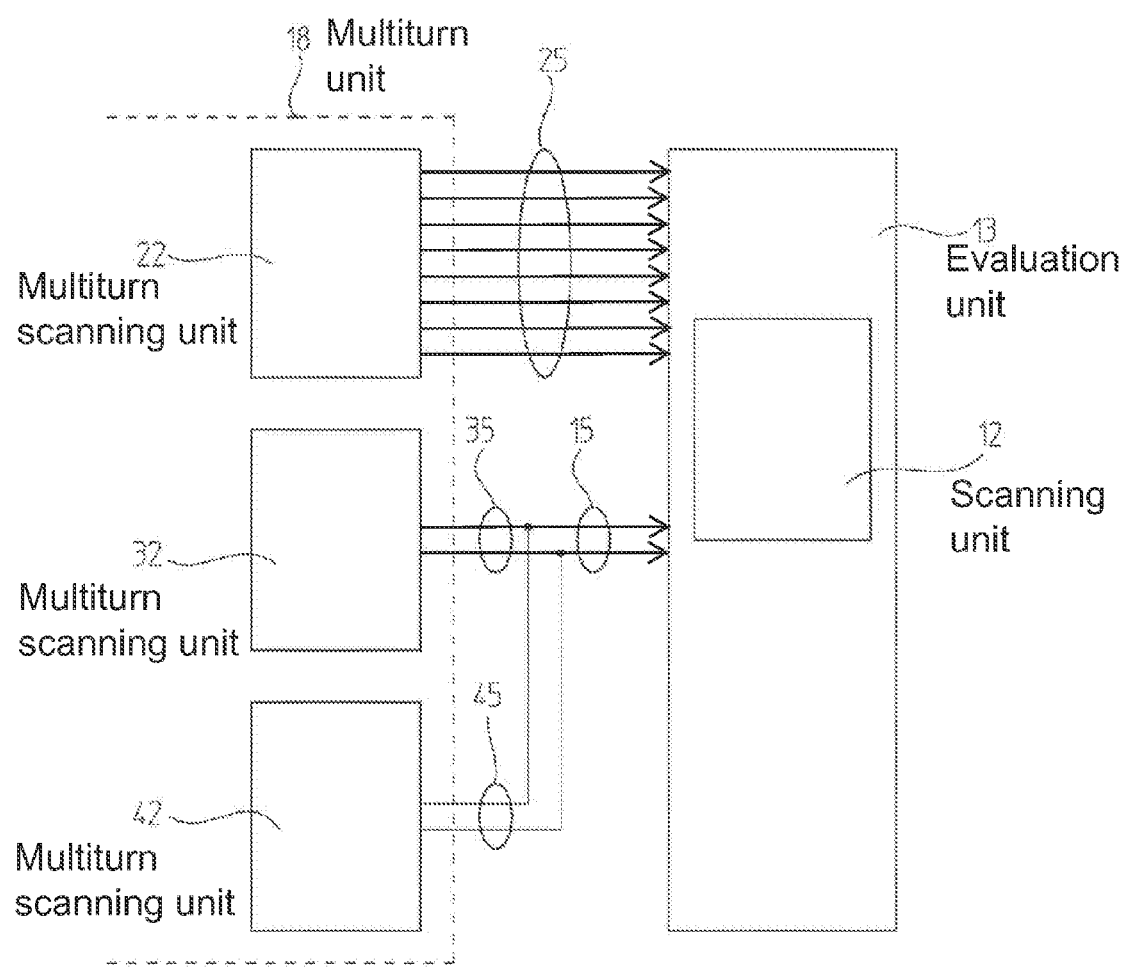
FIG. 3 shows a block diagram of a further interface architecture.

The number of pins needed may be reduced even further if the serial interfaces are not arranged as point-to-point connections, as shown in FIG. 2, but rather as a bus connection, as shown in FIG. 3. This means that in evaluation unit 13, only one common serial interface 15 is provided, to which second multiturn scanning unit 32 is connected in parallel via second interface 35, and third multiturn scanning unit 42 is connected in parallel via third interface 45. A further savings of two pins is thereby achieved at evaluation unit 13. However, this results in a further reduction of the transmission speed, since for the transmission of the absolute position data of second and third multiturn scanning units 32, 42, respectively, evaluation unit 13 must first transmit addressing information to define which of multiturn scanning units 32, 42 is intended to be addressed, i.e., read out at the moment. In addition, the position data are read out from multiturn scanning units 32, 42 sequentially.

FIG. 4 schematically illustrates a multiturn rotary encoder according to an example embodiment of the present invention. The configuration of the singleturn stage corresponds to that of the singleturn stage already described in connection with FIG. 1. In contrast to the exemplary embodiment shown in FIG. 1, multiturn unit 118 includes only one multiturn scanning unit 122, which ascertains revolution data in the form of a counter value, e.g., with data-word length of 18 bits. No reduction gear is provided in this example. To generate one counting pulse per revolution of shaft W, disposed on the shaft is a code element 121, for instance, including a disk-shaped permanent magnet which is scanned by magnetic sensors (not shown). Sensors which are based on the magneto-resistive effect (so-called MR sensors) are particularly suitable for this purpose. An advantageous configuration is obtained if two MR sensors, offset by 90°, are distributed over the circumference of code element 121. Multiturn scanning unit 122 derives counting pulses as a function of the direction of rotation from the sensor signals, and increments or decrements the counter value accordingly. The generating of counting pulses is not limited to a magnetic scanning principle. Thus, for example, optical or inductive scanning principles may be used, as well.

By generating and evaluating, as a function of the direction of rotation, one counting pulse per revolution of shaft W, at any point in time, the counter value directly represents the number of revolutions performed by shaft W. In order not to lose the counter value after the shutdown or a failure of the supply voltage of the multiturn rotary encoder, a battery 128, which provides the electrical energy necessary for retaining the counter value, is also disposed in multiturn unit 118.

The counter value is split into two data words 124, 134, a first data word 124 including lower-order bits of the counter value, and a second data word 134 including higher-order bits of the counter value. Upon rotation of shaft W, first data word 124 has the highest, and second data word 134 has the lowest rate of change of the two data words 124, 134. First data word 124 is transmitted to evaluation unit 13 via a first interface 125, and second data word 134 is transmitted via a second interface 135. First interface 125 is a parallel interface, and second interface 135 is a serial interface, as also shown in FIG. 5.

With regard to reducing the terminal pins needed for transmitting data to evaluation unit 13, the aim should be to transmit as many as possible, advantageously at least half the bits of the counter value via a serial interface. A preferred division of a counter value having an 18-bit data-word length is the use of the eight lower-order bits (0 ... 7) as first data word 124, and the ten higher-order bits (8 ... 17) as second data word 134. If indicated, the data-word length of first data word 124 may be further reduced as a function of the maximum rotational speed of shaft W and the data-transmission speed of second interface 135 used, thus, the serial interface, which in turn further reduces the number of lines needed from evaluation unit 13 to multiturn unit 118. As a special case, only the least significant bit (LSB) of the counter value may be used as first data word 124. In this case, first interface 125 is reduced to only one line.

According to example embodiments of the present invention, multiturn rotary encoders include a multiturn unit 18, 118 in which revolution data are generated, with whose aid the number of revolutions performed by a shaft W is ascertainable in an evaluation unit 13, and which for this purpose, are transmitted to evaluation unit 13 via digital interfaces 25, 35, 45, 125, 135.

What is claimed is:
1. A multiturn rotary encoder, comprising:
a singleturn code disk joined in rotatably fixed manner to a shaft and including a code track scannable by a singleturn scanning unit to ascertain an absolute position within one revolution of the shaft;

a multiturn unit adapted to measure revolution data to ascertain a number of revolutions performed by the shaft;

an evaluation unit connected to the multiturn unit by at least two digital interfaces to transmit the revolution data;

wherein the revolution data include at least two data words having a different rate of change during rotation of the shaft;

wherein a first interface of the digital interfaces is arranged as a parallel interface adapted to transmit a data word having a highest rate of change to the evaluation unit; and wherein a second interface of the digital interfaces is arranged as a serial interface adapted to transmit a data word having a lowest rate of change to the evaluation unit.

2. The multiturn rotary encoder according to claim 1, wherein the serial interface is arranged as a point-to-point connection.

3. The multiturn rotary encoder according to claim 1, wherein the serial interface is arranged as a bus connection.

4. The multiturn rotary encoder according to claim 1, wherein the serial interface is arranged as a two-wire interface.

5. The multiturn rotary encoder according to claim 1, wherein the evaluation unit includes an application specific integrated component (ASIC).

6. The multiturn rotary encoder according to claim 5, wherein the singleturn scanning unit is integrated in the evaluation unit.

7. The multiturn rotary encoder according to claim 6, wherein the absolute position of the shaft is ascertainable based on an optical scanning principle, the evaluation unit including an opto-ASIC.

8. The multiturn rotary encoder according to claim 1, wherein the multiturn unit includes at least two multiturn code disks having code elements, a reduction gear positioned between the multiturn code disks and the shaft, and multiturn scanning units adapted to measure an absolute position of the multiturn code disks by scanning the code elements, the multiturn scanning units adapted to generate revolution data in the form of data words having the absolute position of the multiturn code disks.

9. The multiturn rotary encoder according to claim 1, wherein the multiturn unit is adapted to generate revolution data in the form of a counter value having lower-order bits assigned to a first data word and higher-order bits assigned to a second data word, the first data word being the data word having the highest rate of change and the second data word being the data word having the lowest rate of change.

10. The multiturn rotary encoder according to claim 9, wherein the multiturn unit includes a code element arranged on the shaft and a multiturn scanning unit adapted to generate the counter value, and by scanning the code element, to generate counting pulses as a function of a direction of rotation to increment or decrement the counter value.

* * * * *